United States Patent [19]

He

[11] Patent Number: 5,400,247
[45] Date of Patent: Mar. 21, 1995

[54] ADAPTIVE CROSS-DIRECTIONAL DECOUPLING CONTROL SYSTEMS

[75] Inventor: George X. He, Menlo Park, Calif.

[73] Assignee: Measurex Corporation, Inc., Cupertino, Calif.

[21] Appl. No.: 901,844

[22] Filed: Jun. 22, 1992

[51] Int. Cl.$^6$ .......................... G05B 13/02; D21F 7/02; G06F 15/46

[52] U.S. Cl. .................... 364/148; 364/157; 364/471; 162/262

[58] Field of Search ............... 364/148, 157, 470, 471; 162/262

[56] References Cited

U.S. PATENT DOCUMENTS

| | | | |
|---|---|---|---|
| 3,749,891 | 7/1973 | Burrows et al. | 364/165 |
| 3,767,900 | 10/1973 | Chao et al. | 364/164 |
| 4,707,779 | 11/1987 | Hu | 364/471 |
| 4,947,684 | 8/1990 | Balakrisnan | 364/471 |
| 5,032,977 | 7/1991 | Beller et al. | 364/165 |
| 5,121,332 | 6/1992 | Balakrisnan et al. | 364/471 |

*Primary Examiner*—Paul P. Gordon
*Attorney, Agent, or Firm*—Burns, Doane, Swecker & Mathis

[57] ABSTRACT

A method and apparatus for controlling a multiple-input, multiple-output (MIMO) system, such as a sheet-making system, including identifying a decoupling gain matrix by comparing an actuator control vector against a measured output vector and processing an error vector to update the decoupling gain matrix. The dynamic components of one dynamic mode in the system are separated from that of other dynamic modes such that the input-output characteristic of the process may be treated as independent channels.

13 Claims, 5 Drawing Sheets

FIG._9   SAMPLE PERIODS

FIG._10   SAMPLE PERIODS

ADAPTIVE CROSS-DIRECTIONAL DECOUPLING CONTROL SYSTEMS

BACKGROUND OF THE INVENTION

1. Field of the Invention

The present invention generally relates to a method and apparatus for controlling the operation of multiple input, multiple output (MIMO) systems. More particularly, the present invention relates to control systems for papermaking machines of the type that have actuators arranged in the cross-direction.

2. State of the Art

In the art of making paper with modern high-speed machines, sheet properties must be continually monitored and controlled to assure sheet quality and to minimize the amount of finished product that is rejected when there is an upset in the manufacturing process. The sheet variables that are most often measured include basis weight, moisture content, and caliper (i.e., thickness) of the sheets at various stages in the manufacturing process. These process variables are typically controlled by, for example, adjusting the feedstock supply rate at the beginning of the process, regulating the amount of steam applied to the paper near the middle of the process, or varying the nip pressure between calendaring rollers at the end of the process.

On-line measurements of sheet properties can be made in both the machine direction and in the cross direction. In the sheetmaking art, the term "machine direction" refers to the direction that the sheet material travels during the manufacturing process, while the term "cross direction" refers to the direction across the width of the sheet which is perpendicular to the machine direction.

Cross-directional measurements are typically made using a scanning sensor that periodically traverses back and forth across the width of the sheet material. A complete scan from one edge of the sheet to the other typically requires between twenty and thirty seconds for conventional high-speed scanners, with one measurement being read from the sensor about every fifty milliseconds. Consequently, approximately 600,000 measurements are made during each cross-directional scan.

In conventional practice, papermaking machines have several control stages with numerous, independently-controllable actuators that extend across the width of the sheet at each control stage. For example, a papermaking machine might include a steam box having numerous steam actuators that control the amount of heat applied to several zones across the sheet. Similarly, in a calendaring stage, a segmented calendaring roller can have several actuators for controlling the nip pressure applied between the rollers at various zones across the sheet.

In a modern paper making machine, all of the actuators in a stage must be operated to maintain a uniform and high quality finished product. Such control might be attempted, for instance, by an operator who periodically monitors sensor readings and then manually adjusts each of the actuators until the desired output readings are produced. In practice, however, manual control is not fast enough for modern high-speed paper making machines, especially during an upset condition in the process. Thus, in common practice, sheetmaking machines include control systems for automatically adjusting cross-directional actuators using signals sent from scanning sensors.

In theory, if each actuator affected only one cross-directional zone of a sheet, then a sensor signal, or reading, from that particular zone could be used to control the associated actuator for that particular zone. (In the art of sheetmaking, the cross-directional zones are often referred to as "slices" because they extend along the length of the sheet in the machine direction; in the following the terms are used interchangeably.) In practice, however, each actuator not only affects its own slice on a sheet but, to a greater or lesser extent, other slices across a sheet. For example, a steam valve near the middle of a sheet might also affect the moisture content of adjacent slices. This problem is often referred to a "cross-directional coupling."

The cross-directional coupling problem can be illustrated by analogy to a simple manual control system. Consider, for example, the problem faced by the operator of a manually controlled paper making machine when only one zone has a high moisture content. Because of cross-directional coupling, the operator cannot merely increase the steam heat to the one wet zone without simultaneously reducing the steam (or adding water with a water spray) to each of the neighboring zones. But, decreasing the heat in neighboring zones will effect other zones, and so on, and so on. In other words, any corrective action in one cross-directional zone will affect the papermaking process in other zones. In control systems terminology, the dilemma faced by the machine operator can be described as a coupling of the actuator/sensor control channels for each zone.

In practice, then, the control actions of an actuator in one cross-directional zone must account for sensor measurements from each of the other zones. One general approach to solving the problem of control channel coupling is to make compensation for sensor measurements to cancel the effects of cross-directional coupling before those measurements are used to control the actuators. Conventionally, decoupling compensation is accomplished by deriving a set of mathematical relationships that describe the effect of each actuator on each of the different zones. The coupling equations can then be represented in a matrix format which is then inverted to produce a decoupling matrix. In other words, the decoupling matrix represents a set of mathematical relationships which can be used to compensate the sensor measurements in each zone for the effects of all the other actuators. Consequently, the actual sensor measurement signals from each zone can be compensated, or decoupled, and these decoupled signals can be used as independent control channels to control the papermaking machine.

One shortcoming of conventional decoupling control techniques is that the coupling matrices are usually difficult to derive. This is because the coupling matrix will have one column for each actuator and one row for each measurement slice. Consequently, for paper-making machines with many actuators and zones, the coupling matrix can be quite large, requiring substantial amount of time to derive and a significant amoumt of effort to invert. Another shortcoming of conventional decoupling control techniques is that the coupling properties, and thus the coupling matrix, may change from time to time under different operating conditions. However, conventional decoupling control techniques do not allow the decoupling matrix to be updated in a timely fashion in order to match changes in the process.

Conventional decoupling control techniques may be improved by identifying the time varying coupling matrix at different times during the process. The most recently identified coupling matrix can then be inverted and used to construct a decoupling matrix which is suitable for controlling the process at any particular time. However, a conventional control system that identified and inverted multiple coupling matrices would require a protracted amount of computation time, with the result that substantial quantities of inferior sheet material may be produced before corrective actions are implemented by the control system.

Not only is an automatic control system that involves matrix inversion too slow, but also such a system often is not accurate enough to adequately control modern high-speed sheetmaking processes. This is because calculating the inverse of a large matrix is often difficult, and sometimes impossible. In fact, even with the aid of a high speed computer, numerical matrix inversion can be very sensitive to errors in the sensor measurements which are known as instabilities in the numerical method used to invert the matrix.

SUMMARY OF THE INVENTION

The present invention, generally speaking, provides a control system having multiple inputs and multiple outputs where the dynamic components of one dynamic mode in the system are separated from that of other dynamic modes such that the input-output characteristics of the process may be treated as independent channels. More specifically, the present invention provides a control system for sheetmaking systems (such as papermaking machines) having several control actuators distributed across the sheet where the control system operates such that the individual effect of each actuator on the process is separated, or decoupled, from the effects of other actuators on the process. In practice, the control system of the present invention can be continuously modified, or adapted, to fit changing environmental and process conditions.

In practice, the system of the present invention controls a coupled process with a decoupling matrix. Further, the system employs measurements from several coupled zones to directly identify the decoupling matrix.

In a system according to the present invention, controlled input signals to the actuators are operated upon by a theoretical model of the papermaking machine dynamics without the effect of coupling. At substantially same time, measured output signals from the sensors are acted upon by a mathematical decoupling model represented by an adjustable decoupling matrix. The output from the model without coupling is then compared to the output from the adjustable decoupling model. The decoupling matrix is then continuously adjusted to minimize the difference between these two signals. When the difference between the two signals is being minimized, the adjusted decoupting matrix is used to process the measured output signal from the sensors before sending that signal to a controller having one independent control channel for each actuator.

Consequently, the system of the present invention permits control of a sheetmaking process without the necessity of mathematically deriving and numerically inverting, a coupling matrix. The decoupling matrix can also be continuously modified, or adapted, to compensate for changes in the condition of the papermaking machine that might be caused, for example by changing environmental or process conditions.

The system of the present invention can be easily applied to handle the situations when the number of measurement slices is larger than the number of actuators, which is often encountered when using scanning sensors. In this case, the decoupling matrix is not a square matrix but an m×n matrix with "n" columns greater than "m" rows.

The system of the present invention can also be easily reduced in the situation where a knowledge of the coupling properties is available, for example when only a portion of the measurements from part of the slices are needed to operate one actuator input. In this case, the computation time can be reduced.

The application of the present invention is by no means limited to sheetmaking process. It can be directly applied to many other time varying systems with multiple input and multiple output (MIMO). The sheetmaking system is used as an example for the convenience of description.

BRIEF DESCRIPTION OF THE DRAWINGS

The present invention can be further understood with reference to the following description and attached drawings, wherein like elements are provided with the same reference numerals. In the drawings.

DESCRIPTION OF THE PREFERRED EMBODIMENTS

Figure 1:
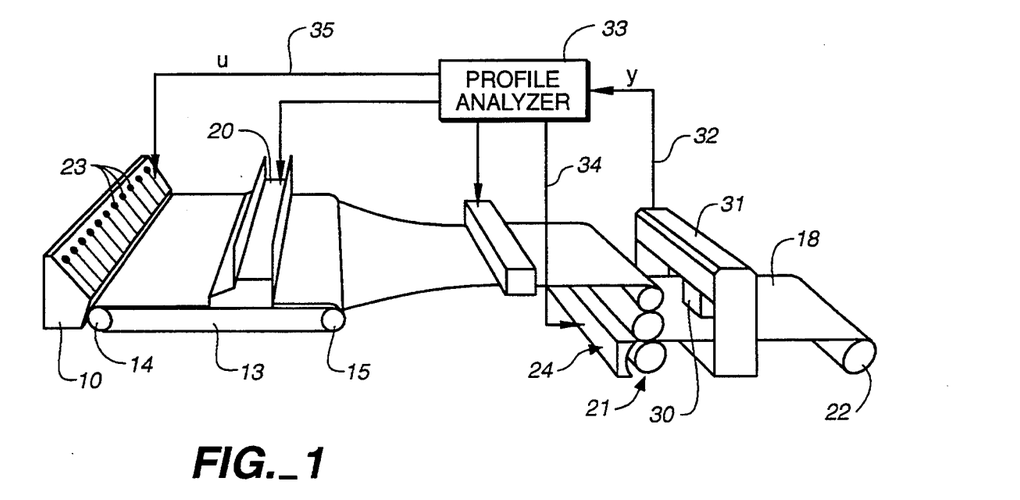
FIG. 1 shows an example of a typical sheetmaking system for making sheets such as paper sheets.

In FIG. 1, a typical system for producing continuous sheet material includes processing stages including a feedbox 10, a steambox 20, a calendering stack 21 and reel 22. Actuators 23 in feedbox 10 discharge raw material onto supporting web 13 which is trained to rotate between rollers 14 and 15. Steam is supplied to the raw material on supporting web 13 through steam valves and actuators, not shown, in steambox 20.

In the system of FIG. 1, unfinished sheet product is removed from supporting web 13 and sent to calendaring stack 21 which includes actuators 24 for controlling the compressive pressure applied to sheet 18 at various slices across the sheet. A scanning sensor 30, which is supported on supporting frame 31, periodically traverses the sheet and measures properties of the finished sheet in the cross-direction. The finished sheet product is then collected on reel 22.

Normally in operation of the system of FIG. 1, a sheet is traversed from edge to edge by scanning sensor 30 at a generally constant speed during each scan. The time required for a typical scan is generally between twenty and thirty seconds for conventional scanners. The rate at which measurement readings are provided by such scanners is usually adjustable; however, a typical rate is about one measurement reading every fifty milliseconds. The scanning sensor is typically controlled to travel at a rate of about one foot per second across the sheet, but multiple stationary scanning sensors could be used.

Further in the system of FIG. 1, the scanning sensor 30 is connected by line 32 to profile analyzer 33. The profile analyzer is a signal processor which includes a control system that operates in response to the cross-directional measurements. The analyzer may also include means for controlling the operation of scanning sensor 30. In operation, scanning sensor 30 provides the analyzer with signals that are indicative of the magnitude of a measured sheet property (e.g., caliper or moisture content) at various cross-directional measurement points. Additional sensors, either travelling or fixed, could also be placed at various points in the control process in order to measure a variety of process variables at any stage in the process. The profile analyzer 33 is connected to control the actuators at various stages in the sheetmaking process. For example, line 34 carries control signals from profile analyzer 33 to control the calender stack actuators 24 in calender stack 21, and line 35 carries control signals to control the feedbox actuators 23.

Figure 2:
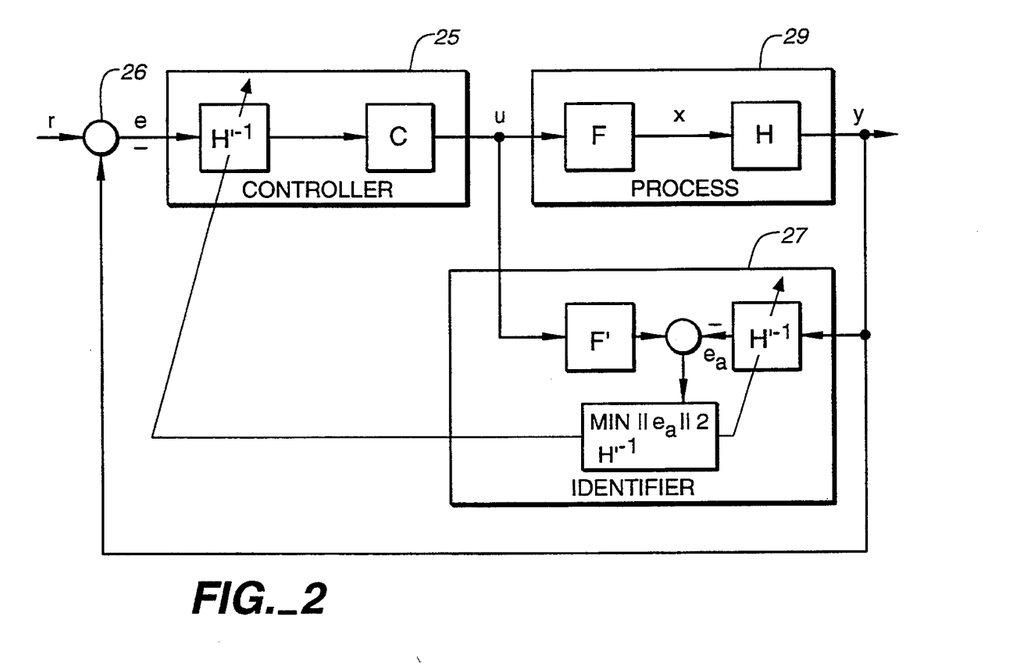
FIG. 2 is a functional block diagram illustrating an adaptive decoupling control system for a sheetmaking process according to the present invention.

As shown in FIG. 2, the control system included in profile analyzer 33 includes a multichannel output signal Y representing a measured output variable from the process "plant". For example, if scanning sensor 30 is arranged to measure caliper, then the vector Y would represent the thickness of the sheet at various slices as measured by scanning sensor 30. Further in the drawing, the vector r represents the desired value of the vector Y. For example, if the scanning sensor is measuring caliper, all elements of r could be set to a desired uniform sheet thickness of 0.010 inches. At a summing junction 26, the output signal Y is subtracted from the reference signal r; the difference is the error signal e. The error signal is provided to the controller 25.

The system in FIG. 2 comprises three general subsystems: a controller subsystem 25, an identifier subsystem 27, and a process subsystem 29. The process subsystems represents the physical plant, a paper machine in this case, in terms of input-output relationships. The input is the actuator setpoint vector with one element for each actuator. The output is the scanning sensor measured vector with one element for each slice. The controller subsystem 25 is essentially a conventional control system. It receives the error signal e and provides, as an output, an actuator control signal u. The actuator control signal u is provided to the process subsystem 29 and to the identifier subsystem 27. The actuator control signal is used to control the actuators in the process. For example, wires carrying the control signals u might run from the controller 25 to control motors on each of the actuators.

As further shown in FIG. 2, the identifier subsystem 27 employs the actuator control signal u and the process output signal Y for generating a decoupling matrix which is then used in the controller subsystem. Both controller subsystem 25 and identifier subsystem 27 in FIG. 2 are parts of a profile analyzer 33 in FIG. 1. The process subsystem 29 in FIG. 2 corresponds to the remaining portion of FIG. 1. Before explaining the complete operation of the identifier subsystem, each of the transfer function blocks in the various subsystems will now be explained.

The process subsystem 29 includes a dynamics block F and a coupling block H. The dynamics block F represents the effect of the actuator control signal u, for any particular actuator, on just the one slice associated with that actuator. For example, a control signal which causes a steam valve actuator near the middle of the sheet to open will have the effect of decreasing the moisture content for the middle slice associated with that steam valve actuator. However, because each actuator will also effect each of the surrounding slices, the process subsystem also includes a coupling block H that represents the effect of each actuator on its surrounding slices. Accordingly, as the actuator control signal u is transformed into the measured output signal Y, it is effected by the process dynamics without coupling, F, and the effects of coupling, H.

The identifier subsystem 27 in FIG. 2 uses models of these same portions of the process system. These models are represented in this text by a " ᐟ " after the block letter (or a "∼" or a " ᐱ " over the block letter label) and they are mathematical models in a computer. For example, block $F^ᐟ$ (which may also be represented using the letter "F" with a "∼" or a " ᐱ " over the letter) represents a mathematical model of the process dynamics without the effects of coupling. Similarly, $H^ᐟ$ represents a mathematical model of the coupling effect in the process. $H^{ᐟ\,-1}$ (also referred to here as "$H^ᐟ$ inverse" or "the inverse of $H^ᐟ$") represents the inverse of the mathematical model representing the coupling effect of the process. $H^ᐟ$ inverse is derived by an automatic tuning that tends to minimize the error signal $e_a$.

As noted earlier, $F^ᐟ$ and $H^{ᐟ\,-1}$ are typically represented in matrix format with each row in the matrix representing one actuator and each column representing one slice (or visa versa). In practice, the matrix $F^ᐟ$ can usually be represented as a diagonal matrix such as shown in Table 1 below.

TABLE 1

| $f_{11}(z)$ | 0 | 0 | 0 | 0 | 0 |
|---|---|---|---|---|---|
| 0 | $f_{22}(z)$ | 0 | 0 | 0 | 0 |
| 0 | 0 | $f_{33}(z)$ | 0 | 0 | 0 |
| 0 | 0 | 0 | $f_{44}(z)$ | 0 | 0 |
| 0 | 0 | 0 | 0 | $f_{55}(z)$ | 0 |
| 0 | 0 | 0 | 0 | 0 | $f_{66}(z)$ |

In the diagonal matrix shown in Table 1, each of the elements $f_{kk}(z)$ represents the dynamic effect that a change in the actuator control signal u will have on output signal Y without the effects of coupling. For example, $f_{11}(z)$ represents the effect of the first actuator on the first slice.

Note that each of the elements $f_{kk}(z)$ is not a single variable but a transfer function which describes a single-input, single-output dynamic subsystem. The matrices $\hat{H}$ and $\hat{H}^{-1}$, unlike matrix $\hat{F}$, are simple matrices with each and every element being a single variable, or a constant in some cases.

The present invention does not require that any particular property of the matrix H or $H^{-1}$ exists. However, in practice, each actuator in a papermaking machine primarily affects one particular slice and its immediate neighbors, but not slices further away. Also, coupling between one actuator and its neighbor slices is almost identical for each control zone. Under such circumstances, the matrix representing $\hat{H}$ can be adequately represented as a banded matrix, as shown in Table 2 below.

TABLE 2

$$\begin{vmatrix} 1 & h_{12} & 0 & 0 & 0 & 0 \\ h_{21} & 1 & h_{23} & 0 & 0 & 0 \\ 0 & h_{32} & 1 & h_{34} & 0 & 0 \\ 0 & 0 & p_{43} & 1 & h_{45} & 0 \\ 0 & 0 & 0 & h_{54} & 1 & h_{56} \\ 0 & 0 & 0 & 0 & h_{65} & 1 \end{vmatrix}$$

In the banded matrix shown in Table 2, the elements far from the main diagonal are all zero. The elements on the main diagonal are all equal and, in this particular example, are all equal to one. However, the diagonal elements may also be set equal to other values. The elements on some diagonal lines near the main diagonal are non-zero and have identical value. In physical terms, the non-zero element $h_{12}$, for example, represents the effect of the first actuator on the second slice. Similarly, the element $h_{23}$ represents the effect the second actuator on the third slice. In practice, the width of the band of non-zero elements on each side of the main diagonal determines the speed and accuracy of the control process. For instance, it may be possible to use additional non-zero elements to create a wider band on each side of the diagonal.

One advantage of recognizing the banded matrix representation of H' is that the unnecessary complexity of the system model is eliminated by reducing the number of unknown parameters which are the elements of matrix H. Consequently, instead of having to mathematically derive the entire H' matrix, it is only necessary to find the non-zero elements in one column of that matrix in order to determine matrix H'. Furthermore, by using a banded matrix to represent H', the number of non-zero elements that must be considered when identifying the inverse of H' can be greatly reduced. This latter advantage can significantly reduce the amount of computation for the identification and thus reduce the response time of the control system. The conditions or restrictions of this later advantage will be presented later with equation (20).

In practice, each of the signals r, u, and Y is represented as a "vector", or a matrix with only one column. Each of the elements in the vector corresponds to one channel associated with one particular slice. For example, in a vector representation of the output process signal Y, each of the elements would represent one measured output variable Y (such as moisture content or caliper) for each of the slices across the sheet. Similarly, a vector can also be used to represent the setpoint of each of the individual actuator control channels u which control the actuators at any particular stage in the process. For example, the vector u for the steam actuators would include control channels $u_1$ through $u_6$ for each of the steam actuator control motors for slices 1 through 6 across the sheet.

Further in practice, the output vector Y is multiplied by a starting estimate of the decoupling matrix $\hat{H}^{-1}$ and, similarly, the actuator control vector u is filtered by an uncoupled MIMO filter represented by the diagonal matrix $\hat{F}$. The results of these two operations are then compared to provide a new vector $e_a$, an error vector, that represents the difference between the results of these two operations. The decoupling matrix $\hat{H}^{-1}$ can then be continually adjusted, or adapted, so as to minimize the magnitude of this error vector $e_a$.

Because the error vector $e_a$ is likely to contain both positive and negative elements, it is preferable to use a least squares identification algorithm to adjust the matrix $\hat{H}^{-1}$ in order to minimize the magnitude of vector $e_a$. Such least squares techniques are well known. One such least squares algorithm is described in *Theory and Practice of Recursive Identification* by Lennart Ljung and Torsten Söderström (MIT Press; Cambridge, Mass. 1983). However, the magnitude of the error could also be minimized using any other technique to adjust the matrix $\hat{H}^{-1}$, including the well known gradiant search or even simple trial and error.

After the error vector $e_a$ is minimized, the resulting empirically derived $\hat{H}^{-1}$ matrix can be copied to the controller subsystem 25 and used to multiply and decouple the error signal e before it is sent to the controller C. Thus, the system can be decoupled without deriving a coupling matrix H' and inverting it for decoupling, and the system can be controlled using conventional means applied to independent (i.e., uncoupled) control channels for each of the actuators.

The matrix $\hat{H}^{-1}$ can be updated as frequently as each time when the new measurements Y (and u) are available, or less frequently. The matrix $\hat{H}^{-1}$ can be copied to controller subsystems as frequently as each time it is updated or less frequently.

The following description will discuss the system of the present invention with more mathematic detail in the context of numerical simulations.

System Model

A general linear model for a multi-input, multi-output (MIMO) control system can be written in mathematical terms as follows.

$$x(z) = \Lambda \left( \frac{N_i(z)}{D_i(z)} \right) Gu(z) + w(z) \quad (1)$$

$$y(z) = Hx(z) + v(z) \quad (2)$$

$$u(z) = C \left( \frac{U_{ij}(z)}{E_{ij}(z)} \right) [r(z) - y(z)] \quad (3)$$

where equations (1) and (2) describe the process (plant) to be controlled and equation (3) describes the control law. In the model, u and y represent input and output ($n \times 1$ dimensional) vectors; r is a reference target; and x is the decoupled state. The $n \times n$ dimensional dynamics matrix, $$\Lambda\left(\frac{N_i(z)}{D_i(z)}\right),$$

is a diagonal transfer function matrix with the ith diagonal element being $$\frac{N_i(z)}{D_i(z)}.$$

The process noise w and measurement noise v are assumed to be random vectors with all elements being zero mean Gaussian and linearly independent.

In many applications, each actuator controls one dynamic mode directly without cross coupling so that cross coupling occurs only in the output. Under such circumstances, the matrix G becomes the identity matrix and, therefore, drops out from equation (1). The following description will focus on the case where G is the identity matrix.

Figure 3:
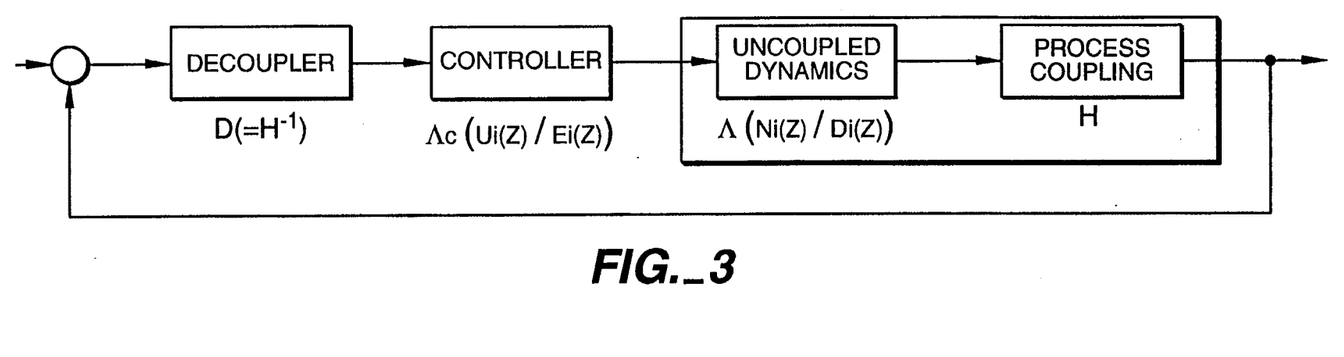
FIG. 3 is a block diagram of an idealized decoupled cross-directional control system.

If the output matrix H is invertible, then an ideally decoupled control system can be constructed as shown in FIG. 3. As shown in that figure, the transfer function matrix of the controller in equation (3) becomes a diagonal transfer function matrix with a gain matrix, $C(z)=\Lambda_c(Ui(z)/Ei(z))D$ where $D=H^{-1}$. Each diagonal term of $\Lambda_c$ can then be designed independently for each control channel by various conventional control methods, which will not be further discussed here.

Decoupling control schemes that require inversion of the matrix H have at least two drawbacks. First, the matrix H is unknown and may drift slowly over time. (In practice, it is easier to determine model frequencies or time constants through spectrum or step response analysis than to determine the component amplitude of each mode in a particular measurement which forms the output coupling gain matrix.) Second, computing the inverse ($H^{-1}$) of matrix H is expensive, sensitive to numerical instabilities, and therefore, hard to implement in a real time system.

The first problem, unknown coupling, can be addressed by identifying the output matrix H, on-line, with a recursive identification algorithm. To address the problem of numerical instability in the matrix inversion, the decoupling gain matrix D ($=H^{-1}$) should be identified directly, without being calculated by inverting an identification result $\hat{H}$ of H. The control system then becomes an adaptive decoupling control system as shown in FIG. 4 where an estimation of the decoupling gain matrix is denoted as $\hat{D}$.

Figure 4:
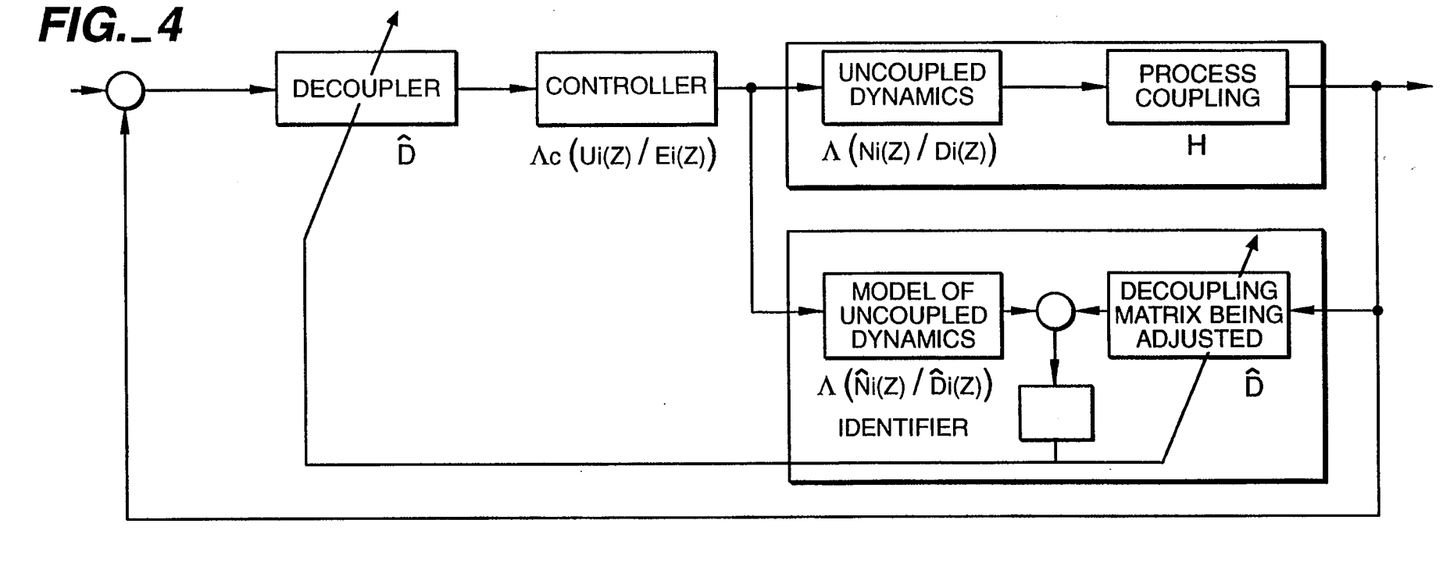
FIG. 4 is a block diagram of an adaptive decoupling control system according to the present invention.

For the system of FIG. 4, the linear system model for the identification of decoupling matrix $\hat{D}$ (the estimation of the inversion of coupling matrix H) can be written as:

$$\hat{x}(t) = Dy(t) + v(t) \qquad (4)$$

where the system output measurement y(t) from equation (2) is the input, and decoupled states estimation $\hat{x}(t)$ is the output. Both the input and output are $n \times 1$ dimensional vectors. If the unknown decoupling matrix D indeed equals the inverse of the coupling matrix H, and if the states estimation is errorless, then equation (4) becomes $$\hat{x}(t) = H^{-1}y(t) + H^{-1}v(t). \qquad (5)$$

When the dynamics of the original system (1) are known, then the estimation of state vector $\hat{x}(t)$ can be obtained from $$\hat{x}(z) = \Lambda\left(\frac{\hat{N}_i(z)}{\hat{D}_i(z)}\right)u(z) \qquad (6)$$

which is a duplication of the system in equation (1) with the model of the system dynamics. Then the matrix D can be identified given the "measurements" $\hat{x}(t)$ and y(t). This matrix identification can be calculated row by row, since equation (4) can be written more explicitly as a system of multiple equations $$\hat{x}_i(t) = \theta_i^T y(t) + v_i(t), \quad 1 \leq i \leq n, \qquad (8)$$

defining a standard linear system identification problem. The number of equations does not have to be the same as the size of the vecotrs y. Therefore, the application of this scheme is not limited to the case where D is square.

There are many recursive algorithms that can be used to identify each row vector $\theta_i^T(t)$ of matrix $\hat{D}$. One such algorithm is the Recursive Least Squares (RLS) algorithm described in *Theory and Practice of Recursive Identification* by Lennart Ljung and Torsten Söderström (The MIT Press: Cambridge, Mass. 1983):

$$\hat{\theta}_i(t) = \hat{\theta}_i(t-1) + L(t)[\hat{x}_i(t) - y^T(t)\hat{\theta}_i(t-1)] \qquad (9)$$

$$L(t) = \frac{P_i(t-1)y(t)}{(\lambda(t)/\alpha_t) + y^T(t)P_i(t-1)y(t)} \qquad (10)$$

$$P_i(t) = \frac{1}{\lambda(t)}\left[P_i(t-1) - \frac{P_i(t-1)y(t)y^T(t)P_i(t-1)}{(\lambda(t)/\alpha_t) + y^T(t)P_i(t-1)y(t)}\right] \qquad (11)$$

where $\lambda(t)$ is a forgetting factor that is usually a positive constant and less than or equal to one. In the algorithm, each identified vector $\hat{\theta}_i(t)$ and its associated matrix $P_i(t)$ are updated at each sample time (or preferably at a slower rate if the system coupling properties drift much slower than the system dynamics). Each element of the decoupling matrix then can be constructed as $$\hat{D}(t) = \begin{bmatrix} \theta_1^T(t) \\ . \\ . \\ . \\ \theta_n^T(t) \end{bmatrix} \qquad (12)$$

and copied to and used in the control loop for decoupling. Many numerical schemes developed for the matrix $P_i(t)$ updating can be used for real time implementation with little modification. One such numerical scheme is U-D factorization described in "Measurement Updating Using the U-D Factorization", IEEE conference on Decision and Control, 1975, by Gerald J. Bierman.

The solution of the RLS algorithm (9-11) with $\lambda(t)=1$ can be written as:

$$\hat{\theta}_i(t) = \qquad (13)$$

$$\left[\sum_{k=1}^{t} y(k)y^T(k) + P_i^{-1}(0)\right]^{-1} \left[\sum_{k=1}^{t} \hat{x}(k)y(k) + P_i^{-1}(0)\theta_i(0)\right],$$

where $\hat{\theta}_i(0)$ is an arbitrary initial condition. The initial condition $P_i(0)$ can be selected as $P_i(0) = pI$ with $p > 10$ such that $P_i^{-1}(0) \approx OI$ and therefore negligible in equation (13).

The robustness of the algorithm can be illustrated by a single-input, single-output (SISO) example, where the output measurement equation (2) becomes $$y(t) = hx(t) + v(t) \tag{14}$$

Assuming that the estimation $\hat{x}(t)$ of the state x is available, then the inversion of the output gain h can be identified from the linear system $$\hat{x}(t) = dy(t) + \epsilon(t). \tag{15}$$

In an extreme case, the output measurement gain is zero (h=0) and thus the output measurement y(t)=e(t) is a zero mean white noise which is independent from x(t). It is clear, from Eqn. (13) that the identification of the inverse output gain converges to zero, i.e. $\hat{d}(t) \to 0$, because the covariance between $\hat{x}$ and y is zero. However, the inverse coupling gain d would be infinity if the zero (coupling) gain h=0 were estimated correctly and then inverted.

It is a general property of most Recursive Least-Square algorithms that when the signal to noise ratio approaches zero, the identification result also converges to zero. The "signal" may be considered as the (observable) component of the state ($\hat{x}_i$ or $\hat{x}$) that is correlated with the measurements (y or y) in the identification model (8 or 15). The "noise" is then the rest of the components of the state. This property is a very attractive feature for the present invention, the adaptive decoupling control scheme. As shown in the above example, the low signal to noise ratio caused by the low output measurement gain (h=0) indicates that the state x is non-observable through the measurement y. Under these circumstances, an optimal controller would be expected to have a low (or zero) feedback gain applied to the measurement as guaranteed by $d(t) \to 0$.

Sheetmaking Applications

In sheet production processes with cross-direction profile control, the control input vector u in equation (1) can be considered as a setpoint profile for all the actuators distributed across the sheet. Each element of vector y is the measurement from one slice of the sheet which is controlled by the corresponding actuator. In such applications, the coupling properties have been found usually to be localized. In other words, each actuator will affect its own zone, and neighboring zones, but not any zones further away. Another characteristic of such applications is that the coupling from one actuator control zone to each of its neighboring zones is almost identical for every control zone because the actuators are all the same. Under such circumstances, the output coupling gain matrix H is a band (or banded) matrix with all the diagonal elements having identical values and zero value for all the elements far away from the main diagonal as shown in Table 3.

TABLE 3

| $h_0$ | $h_1$ | — | $h_m$ | 0 | 0 |
|---|---|---|---|---|---|
| $h_1$ | $h_0$ | $h_1$ | — | $h_m$ | 0 |
| — | $h_1$ | $h_0$ | $h_1$ | — | $h_m$ |
| $h_m$ | — | $h_1$ | $h_0$ | $h_1$ | — |
| 0 | $h_m$ | — | $h_1$ | $h_0$ | $h_1$ |
| 0 | 0 | $h_m$ | — | $h_1$ | $h_0$ |

In Table 3, $h_0$ is the zone process gain and $h_1$, $h_{-1}$, ..., $h_m$ and $h_{-m}$ are the coupling coefficients for each control zone with its m neighboring zones at each side.

In this special case, equation (2) can be written in the form of a convolution as:

$$y_i = \sum_{k=-m}^{m} h_{-k} x_{i-k} + v_i, \tag{17}$$

with states $x_i$ being extended such that $$x_i = 0, \text{ for } i \leq 1 \text{ or } i \geq n. \tag{18}$$

Taking the z-transform and using q as a spatial shifting operator, the above equation becomes:

$$y(q) = H(q)x(q) + v(q), \tag{19}$$

with $$H(q) = \sum_{k=-m}^{m} h_k q^k. \tag{20}$$

The polynomial H(q) can be viewed as a spatial transfer function from spatial sequence x(q) to y(q). Obviously, the transfer function of the ideal decoupling filter should be the inversion of H(q). Thus, the decoupled states can be computed from:

$$\hat{x}(q) = \frac{1}{H(q)} y(q) + \epsilon(q), \tag{21}$$

which can be written as the convolution $$\hat{x}_i = \sum_{k=-\infty}^{\infty} d_k y_{i-k} + \epsilon_i, \tag{22}$$

where the convolution decoupling gain sequence $\{d_k\}$ is the impulse response of a noncausal filter that has the transfer function $D(q) = 1/H(q)$. For the case that the sequence $\{d_k\}$ has a finite length, the decoupling algorithm (22) can be implemented as a Finite Impulse Response (FIR) digital filter, or a weighted summation of input elements. The length of sequence $\{d_k\}$ is generally not finite. However, the sequence converges to zero exponentially (as the index approaches infinity) when the transfer function D(q) has no pole located on the unit circle of the plane of complex numbers. Therefore, when the polynomial H(q) has no roots with norm equal to one, then the decoupling coefficient sequence $\{d_k\}$, can be approximated with its truncated version with a finite length.

For example, if the coupling sequence is [c,1,c], then the decoupling coefficient sequence length is not finite. Whether the sequence converges to zero depends on the value of c. The sequence $d_k$ converges to zero as $|k|$ approaches infinity only when $c<0.5$. In this case a finite length (1 typically much less than n) convolution decoupling algorithm can be a good approximation for ideal decoupling.

The convolution decoupling algorithm is a special case of matrix decoupling in which all row vectors being constructed by a vector that shifts towards the right one column for each new row. Each row has only 1 non-zero values around the element on the main diagonal and these non-zero values are identical among all rows, even though their positions are shifted from row to row. In other words, the decoupling matrix is a banded matrix with all diagonal lines having their identical values along the line.

It should be pointed out that the general adaptive decoupling control scheme of the present invention is not limited to the ones that the coupling matrix is banded. Actually, the present invention can be applied for the circumstances with any coupling matrix.

The special conditions specified above on the coupling matrix are the conditions for a simplified version of the invented scheme but not a restriction for the general form.

Numerical Simulation

Numerical simulations were conducted for a linear system with 30 states (a 30th order system) which can be described by equations (1) and (2) with n=30, G=I as follows.

$$h_0=1.0, \ h_{-1}=h_1=0.6, \ and \ h_2=h_{-2}=-0.3 \quad (24)$$

The controller used in the test was a delay time compensated PI controller which was described by the transfer function matrix $$C(z) = \Lambda\left(\frac{U_i(z)}{E_i(z)}\right) \quad (25)$$

with all non-diagonal elements equal to zero and all diagonal elements identical as:

$$\frac{U_i(z)}{E_i(z)} = [1 +$$

$$(1 - e^{-T/a})(z^{-1} + z^{-2} + z^{-3} + z^{-4})^{-1}] \frac{(1 - e^{-T/2})(z - a)}{z(z - 1)}$$

which is known as Dahlin's controller.

Process noise w(t) and measurement noise v(t) are generated with a Gaussian pseudo random number generator having 30 independent elements. A higher amplitude disturbance impulse random profile was introduced at the $0^{th}$ and $25^{th}$ sample time through reference target r. The coupling gain matrix (24) was changed at the $20^{th}$ sample time such that all elements were shifted to right by one column in order to simulate a change in the alignment of crossdirection control which changed the coupling properties of the system seen by the controller.

The simulation was run for four different cases:
Case 1: Assumed the coupling was known, exact inversion of the coupling matrix was applied for ideal decoupling.
Case 2: Full matrix adaptive decoupling was applied.
Case 3: Convolution adaptive decoupling was applied.
Case 4: Assumed the coupling was unknown, no decoupling scheme was used.

Figure 5:
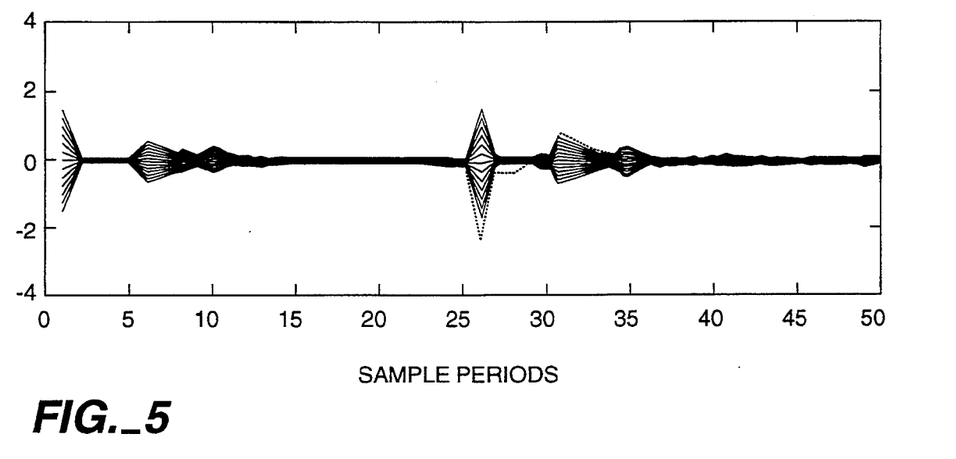
FIG. 5 shows the results of a simulation for an ideally decoupled controlled system, as shown in FIG. 3, according to Case 1.
Figure 6:
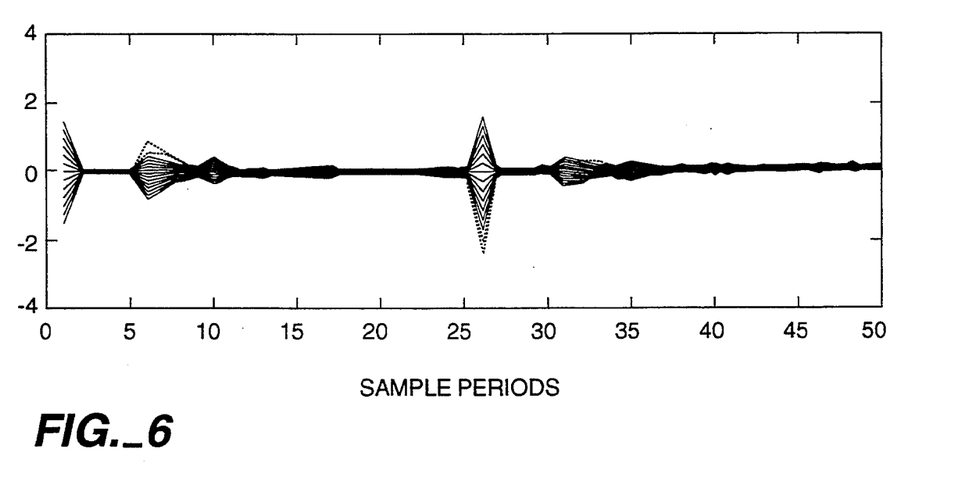
FIG. 6 shows the results of a simulation for a full matrix adaptive decoupling controlled system, as shown by FIG. 4, according to Case 2.

FIG. 5 shows a side view of the system output measurement profile propagating over time for Case 1. FIG. 6 shows the same output measurement for Case 2 with the full decoupling matrix identified with a forgetting factor of $\lambda=0.95$ in the RLS algorithm.

Figure 7:
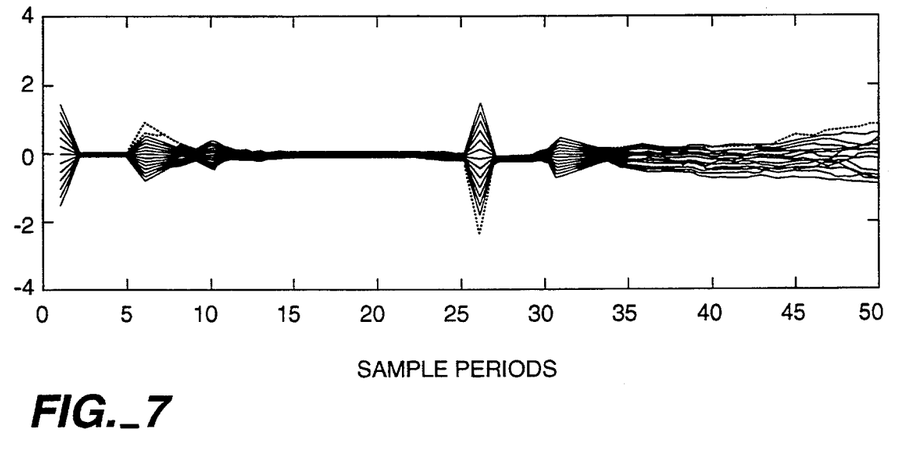
FIG. 7 shows the results of a simulation for a convolution adaptive decoupling controlled system (which is a simplified version of the system in Case 2) according to Case 3.
Figure 8:
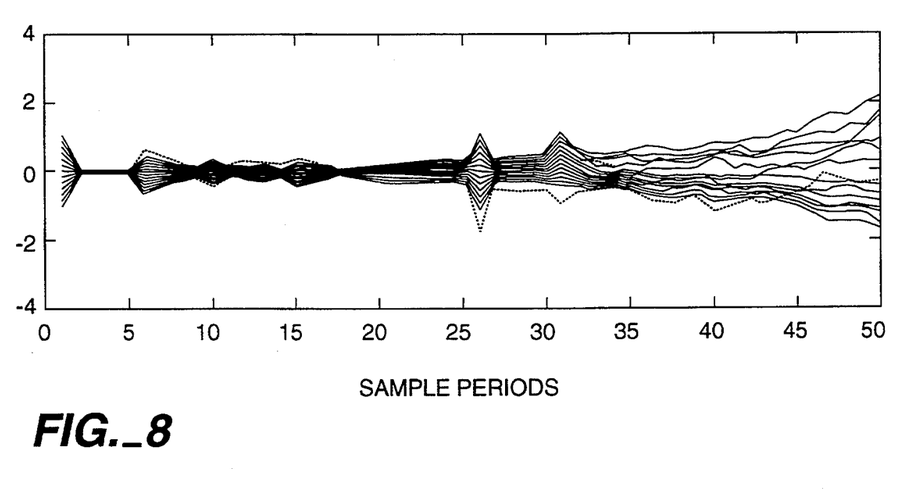
FIG. 8 shows the results of a simulation for the same system without decoupling.
Figure 9:
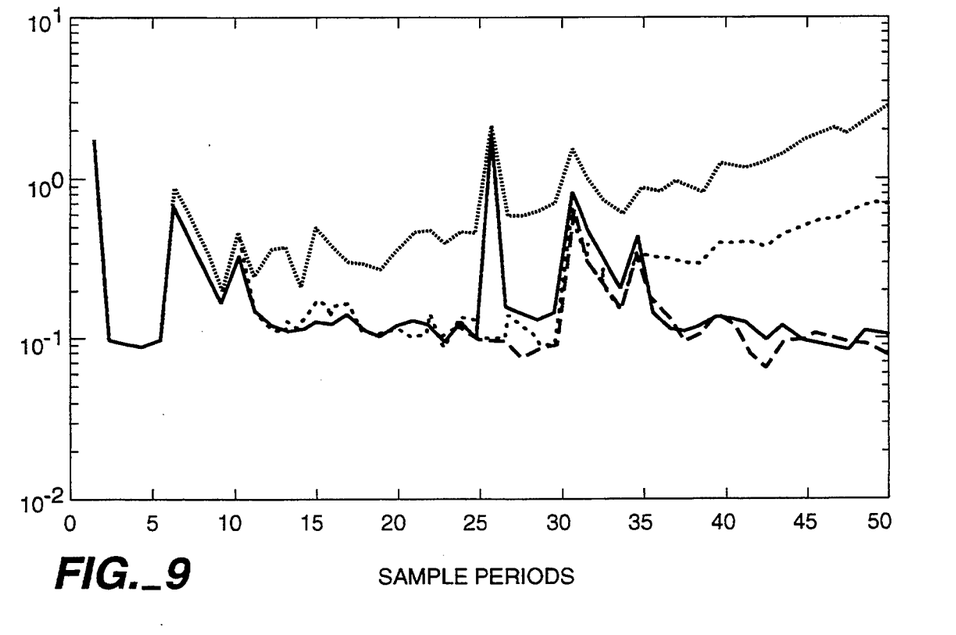
FIG. 9 shows a comparison of the performance of simulated systems for Cases 1–4 in terms of the standard deviation (scaled by a factor of 2) of directional spread at various sample times.
Figure 10:
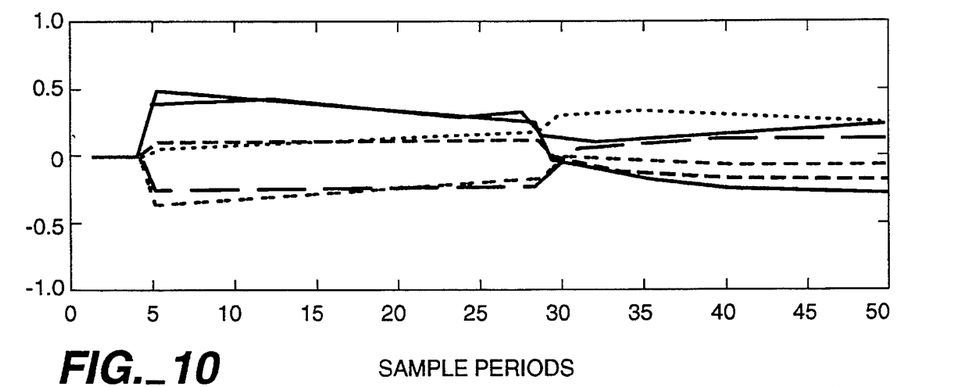
FIG. 10 shows the identified convolution decoupling gains for the simulation of Case 3.

FIG. 7 shows the output measurement profile for Case 3 with a decoupling convolution vector of $l=7$ and a forgetting factor $X=0.95$. FIG. 8 shows the results of Case 4 with no decoupling. FIG. 9 shows the 2-! spread (approximated by double the Root-Mean-Square "RMS" value) of the cross directional (CD) profiles for each of the four cases with a solid line for Case 1, a long dash line for Case 2, short dash line for Case 3, and a dot line for Case 4. FIG. 10 shows the identified convolution decoupling gains propagating over time, with the change at time 30T being caused by a change of the coupling matrix at 25T. The timing difference is due to the time delay of sample periods.

The information in FIG. 9 suggests the following conclusions:

1. The full matrix adaptive decoupling scheme works almost as well as ideal decoupling. The output error for full matrix adaptive decoupling remained at the system noise level. This conclusion holds for the cases where the coupling matrix is not a banded matrix. The simulation has been run for cases with various non-banded and unsymmetrical coupling matrices. The results are similar to what was presented here and omitted.

2. The adaptive convolution decoupling scheme works as well as full matrix decoupling while the CD control is correctly aligned. However, after the alignment is changed the output error starts to diverge under disturbances. The alignment change severly violated the special conditions for the adaptive convolution decoupling scheme.

3. Without decoupling (D=I), the system performance is intolerable. The decoupled controller is unstable even with correct alignment.

For this simulated system, the polynomial (20) has two roots located on a unit circle with their norm being one. This indicates that an ideal decoupling convolution vector would need to be of infinite dimension. However, the seven element vector used in Case 3 of the simulation showed fairly good control performance when the alignment was correct, thus demonstrating the robustness of the adaptive decoupling control scheme. When the alignment is changed, however, the convolution model becomes too far from reality and the decoupling scheme falls apart. The full matrix adaptive decoupling scheme, however, works well regardless of the alignment or the form and value of the coupling gain matrix.

At this juncture, it can be understood that the output adaptive decoupling control system, with controls applied directly onto each observable mode, makes the process of designing a controller for a multi-input, multi-output (MIMO) system substantially the same as that of designing a single-input, single output (SISO) system. For the type of coupling that has a locally limited range and coupling gains which are identical and symmetric for all modes (the typical case for most sheet production processes using cross-directional control with good alignment), a less expensive adaptive convolution decoupling scheme can be used to replace the full matrix decoupling. Numerical simulation shows that both schemes perform as well as ideal decoupling, while the same controller without a decoupling scheme can cause the system to become unstable. Furthermore, the convolution decoupling scheme is vulnerable to the alignment of the system.

The foregoing has described the principles, preferred embodiments, and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed:

1. A method of controlling a sheetmaking process using an adaptive decoupling, multiple-input, multiple-output control system, comprising the steps of:
    applying to the system an actuator control signal;
    producing a process output signal by measuring an output of the process;
    identifying a decoupling gain matrix by:
        a) filtering the actuator control signal by a matrix filter representing uncoupled dynamics of the process to produce a filtered actuator control signal;
        b) decoupling the process output signal by multiplying it with an adjustable matrix representing inverted coupling of the system to produce a decoupled output signal; and
        c) adjusting the adjustable matrix so as to minimize a difference between the filtered actuator control signal and the decoupled output signal, thereby producing the decoupling gain matrix;
    comparing the output signal to a reference signal to produce an error signal for controlling sheet quality of the sheetmaking process; and
    applying the decoupling gain matrix to the error signal to produce the actuator control signal.

2. A method according to claim 1 wherein said sheetmaking process is a papermaking process.

3. A method according to claim 1 wherein the adjustable matrix is continuously adapted during operation of the sheetmaking process.

4. A method according to claim 1 wherein the filter matrix representing uncoupled dynamics of the sheetmaking process is a diagonal matrix.

5. A method according to claim 1 wherein the matrix representing inverted coupled dynamics of the sheetmaking process is reduced to a banded matrix.

6. An adaptive decoupling, multiple-input, multiple-output control system for controlling a sheetmaking process, comprising:
    means for applying to the system an actuator control signal;
    means for producing a process output signal by measuring an output of the sheetmaking process;
    means for identifying a decoupling gain matrix, comprising:
        a) means for filtering the actuator control signal by a matrix filter representing uncoupled dynamics of the sheetmaking process to produce a filtered actuator control signal;
        b) means for decoupling the process output signal by multiplying it with an adjustable matrix representing inverted coupling of the system to produce a decoupled output signal; and
        c) means for adjusting the adjustable matrix so as to minimize a difference between the filtered actuator control signal and the decoupled output signal, thereby producing the decoupling gain matrix;
    means for comparing the output signal to a reference signal to produce an error signal for controlling sheet quality of the sheetmaking process; and
    means for applying the decoupling gain matrix to the error signal to produce the actuator control signal.

7. An apparatus according to claim 6 wherein said adjusting means uses an algorithm selected from the group consisting of a least squares identification algorithm and a gradient search algorithm.

8. An apparatus according to claim 6 wherein the adjustable matrix is continuously adapted during the operation of the sheetmaking process.

9. An apparatus according to claim 6 wherein the matrix representing uncoupled dynamics of the sheetmaking process is a diagonal matrix.

10. An apparatus according to claim 6 wherein the matrix representing inverted coupling of the sheetmaking process is derived from either of a full or a banded matrix.

11. An apparatus according to claim 6 wherein the matrix representing uncoupled dynamics of the sheetmaking process is a transfer function matrix.

12. An apparatus according to claim 6 wherein the matrix representing uncoupled dynamics of the process is a transfer function matrix.

13. An apparatus according to claim 6 wherein said multiple-input, multiple-output sheetmaking process is a papermaking process.

* * * * *